United States Patent [19]
Vos et al.

[11] Patent Number: 4,858,009
[45] Date of Patent: Aug. 15, 1989

[54] TELEVISION SIGNAL MEMORY WRITE CIRCUIT

[75] Inventors: Gerardus J. J. Vos; Louis J. Van Mal, both of Eindhoven, Netherlands

[73] Assignee: U.S. Philips Corporation, New York, N.Y.

[21] Appl. No.: 37,768

[22] Filed: Apr. 13, 1987

[30] Foreign Application Priority Data

Apr. 17, 1986 [NL] Netherlands ............... 8600967

[51] Int. Cl.⁴ ............................................. H04N 5/04
[52] U.S. Cl. ........................................ 358/148; 358/339
[58] Field of Search .............. 358/19, 13, 148, 149, 358/160, 337, 339; 360/36.1, 36.2; 375/118; 369/59

[56] References Cited

U.S. PATENT DOCUMENTS

| | | | |
|---|---|---|---|
| 4,439,786 | 3/1984 | Claydon et al. | 358/148 |
| 4,468,698 | 8/1984 | Kavoussi et al. | 358/148 |
| 4,561,083 | 12/1985 | Nishikawa et al. | 358/339 |

Primary Examiner—Howard W. Britton
Assistant Examiner—David E. Harvey
Attorney, Agent, or Firm—Edward W. Goodman

[57] ABSTRACT

A television signal memory (21) for use, for example, in a circuit for increasing the number of fields with interleaved writing and reading, is controlled by a data signal to be written into (at 19) with the aid of a write clock signal (at 77), this data signal being obtained by sampling (at 5) of the television signal by means of a data clock signal (at 25) coupled to the line frequency of the television signal (37, 41). A phase detection circuit (33) detects each time a given phase relation, between the data clock signal (at 31) and a memory clock signal (at 51) obtained from a free running memory clock signal generator (55) having a higher frequency than the highest data clock signal frequency, is exceeded, and then suppresses a memory clock signal pulse in a pulse suppression circuit (71), and shifts the data in a data shift circuit (15) so that the memory receives a single write clock signal pulse during the occurrence of each data period.

3 Claims, 2 Drawing Sheets

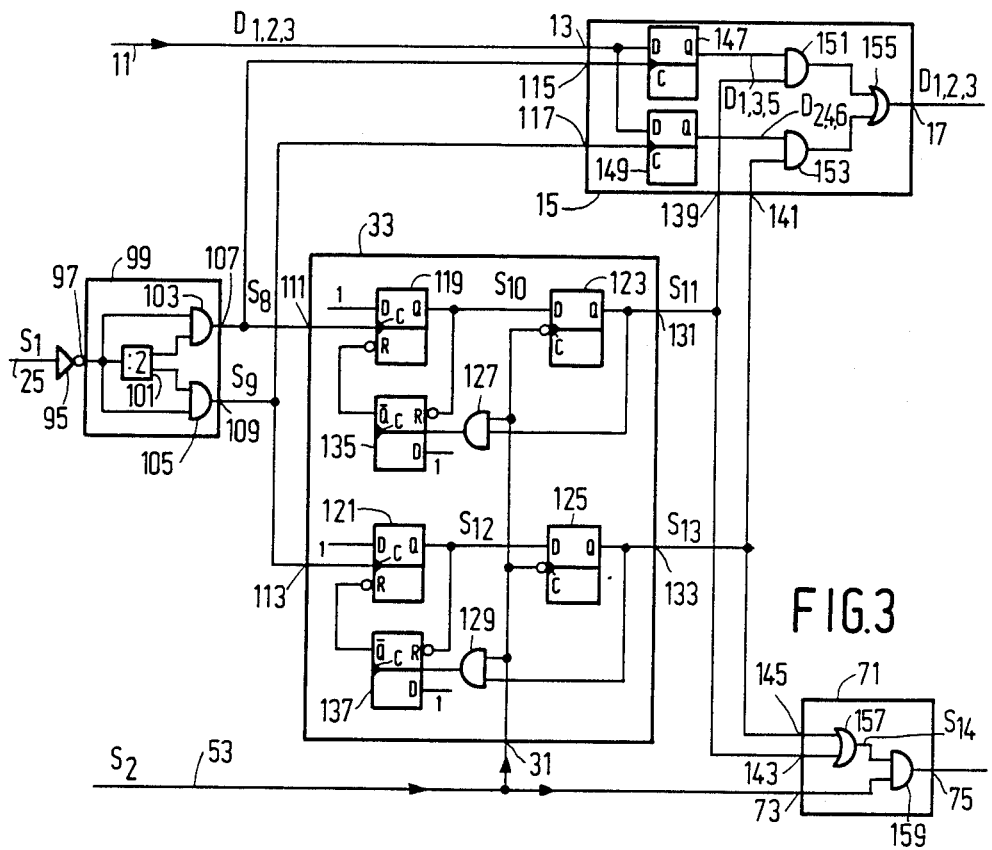
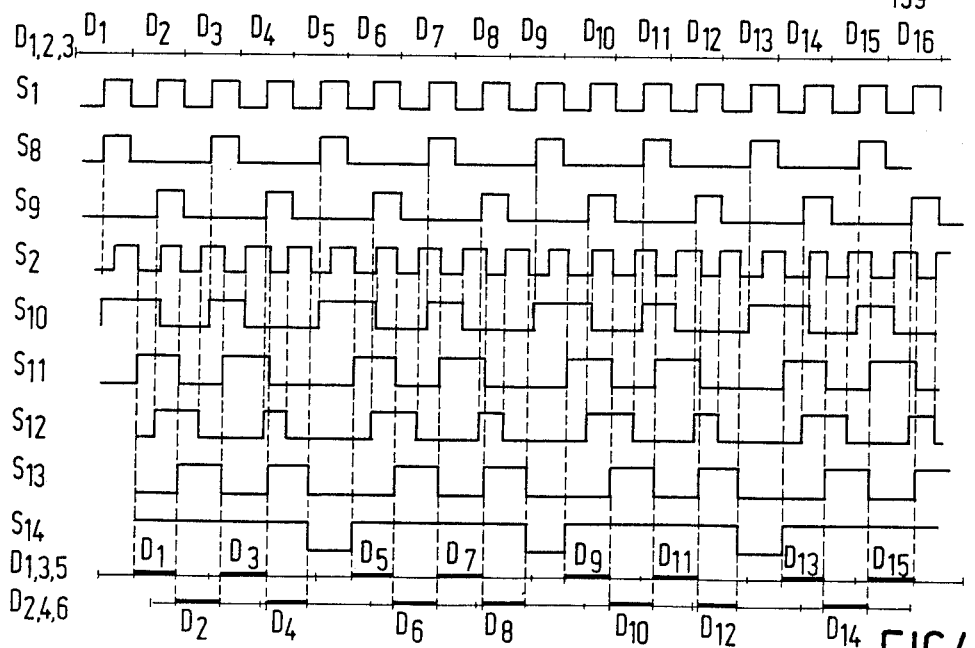
FIG.3
FIG.4

TELEVISION SIGNAL MEMORY WRITE CIRCUIT

BACKGROUND OF THE INVENTION

The invention relates to a television signal memory write circuit including a memory clock signal generator which is coupled to a write clock signal input of a memory, for writing into the memory samples of a television signal which are applied to a data signal input of said memory, said samples being obtained by means of a data clock signal generated by a data clock signal generator, said data clock signal having a frequency which can be coupled by means of a control loop to the line frequency of the television signal.

A television signal memory write circuit of the type described above is known from German Patent Specification No. 31 28 272 in which, together with the data clock signal, also a write and a read clock signal of the memory are frequency-coupled. Consequently, a simple write circuit without a buffer memory is possible and, for example, three read actions of the memory can be performed between two write actions so that the memory can be used for displaying a television signal at an increased field frequency. In the case of variations of the line frequency of the television signal which may occur, for example, in television signals originating from video recorders it is found to be difficult to get the picture elements of the successive rasters in the same positions on the screen of a picture display tube.

SUMMARY OF THE INVENTION

It is an object of the invention to provide a simple possibility of correct display of a television signal applied via the memory.

According to the invention, a television signal memory write circuit of the type described in the opening paragraph is therefore characterized in that the memory clock signal generator is free running at a frequency which is higher than the highest data clock signal frequency occurring in the case of possible variations, while a data shift circuit is coupled to the data signal input and a pulse suppression circuit is coupled to the write clock signal input, said data shift circuit and pulse suppression circuit being coupled to an output circuit of a phase detection circuit coupled to the data clock signal generator and the memory clock signal generator for shifting the data signal and suppressing a memory clock signal pulse when a given phase relation between the data clock signal and the memory clock signal is exceeded.

It is achieved thereby that each write clock signal pulse which is presented to the memory corresponds to a television signal sample and, if per television signal sample two write clock signal pulses tend to occur, one of them is suppressed. The write clock signal pulses are then located in a frequency raster which is not coupled to a varying frequency and can thus be made as stable as possible and may be coupled to a stable read clock signal frequency thus making a stable display on a picture display tube possible.

BRIEF DESCRIPTION OF THE DRAWINGS

The invention will now be described in greater detail with reference to the drawings.

In the drawings:

FIG. 3 illustrates, by way of a principle circuit diagram, a further possible embodiment of a television signal memory write circuit according to the invention; and FIG. 4 shows, by way of a number of waveforms, a number of signals as they occur in the circuit of FIG. 3.

DETAILED DESCRIPTION OF THE INVENTION

Figure 1:
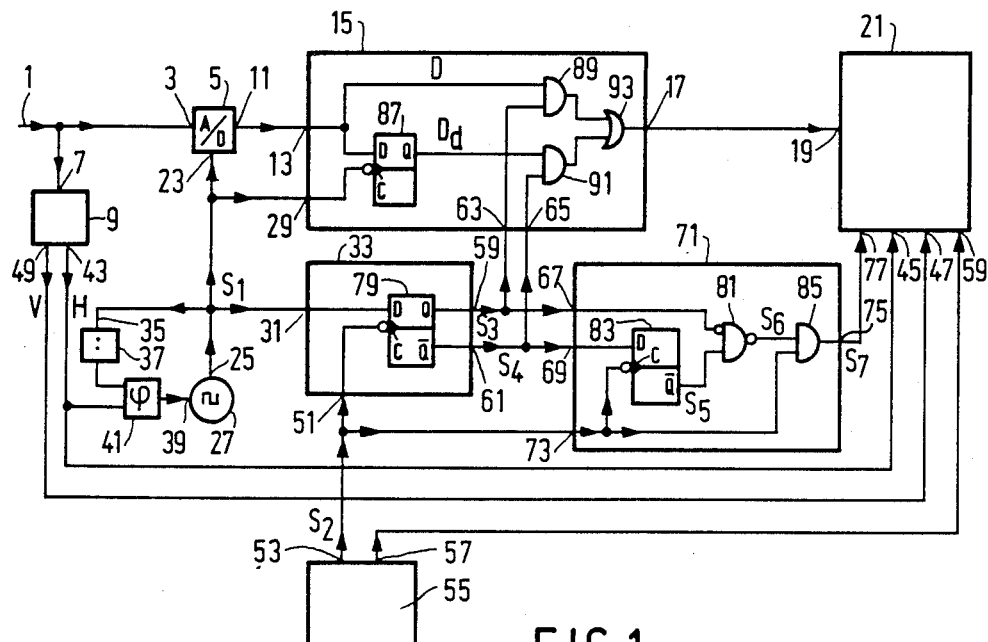
FIG. 1 illustrates, by way of a principle circuit diagram, a possible embodiment of a television signal memory write circuit according to the invention.

In FIG. 1 a television signal is applied to an input 1 which is connected to an input 3 of a sampling circuit 5 formed as an analog-to-digital converter and to an input 7 of a synchronizing signal separator 9.

An output 11 of the sampling circuit 5 supplies at an input 13 of a data shift circuit 15 a sampled, digitized television signal which will hereinafter be referred to as a data signal. The output 11 is a multiple output when the bits of the data signal are simultaneously available for each television signal sample and it is a single output when these bits are supplied serially. For the sake of clarity the data shift circuit is shown in a single form. In principle, the operation of the circuit is the same in both cases.

An output 17 of the data shift circuit 15 applies a data signal which is corrected in position, as will be explained hereinafter, to a data signal input 19 of a memory 21.

A sampling signal input 23 of the sampling circuit 5 is connected to an output 25 of a data clock signal generator 27 which is also connected to a data clock signal input 29 of the data shift circuit 15, to a data clock signal input 31 of a phase detection circuit 33 and to an input 35 of a frequency divider 37.

A control signal input 39 of the data clock signal generator 27 is connected to an output of a phase detector 41, an input of which is connected to an output of the frequency divider 37 and another input of which is connected to an output 43 of the synchronizing signal separator 9 at which synchronizing signals H occur at the line frequency of the television signal. These synchronizing signals are also supplied to an input 45 of the memory 21 an input 47 of which also receives synchronizing signals V at the field frequency of the television signal originating from an output 49 of the synchronizing signal separator 9.

Due to the control loop with the frequency divider 37 and the phase detector 41, the data clock signal at the output 25 of the data clock signal generator 27 is frequency-coupled to the line frequency of the television signal. The waveform S1 of this data clock signal is shown in FIG. 2.

Figure 2:
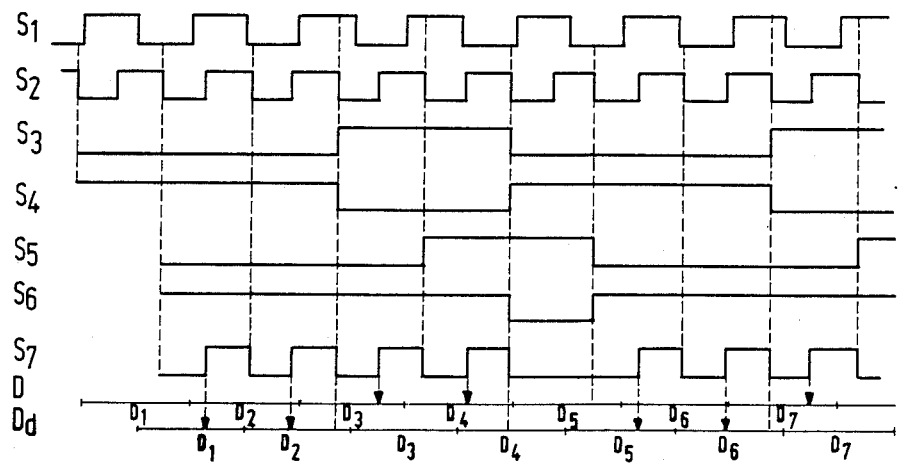
FIG. 2 illustrates, by way of a number of waveforms, a number of signals as they occur in the circuit of FIG. 1.

The phase detection circuit 33 has a memory clock signal, input 51 to which a memory clock signal originating from an output 53 of a memory clock signal generator 55, is applied whose waveform is denoted by S2 in FIG. 2. The memory clock signal generator 55 is free running, that is to say, it is not frequency-coupled to the line frequency and to the data clock signal. The frequency of the memory clock signal is preferably maintained very stable, and is chosen to be slightly higher than the highest data clock frequency occurring in the case of variations. A further output 57 of the memory clock signal generator 55 applies a read clock signal to a read clock signal input 58, which signal is frequency and phase-coupled in a desired manner to the memory clock signal, dependent on the purpose for which the memory 21 is used.

The phase detection circuit 33 has an output combination 59, 61 at which signals having a waveform denoted by S3 and S4 in FIG. 2 occur. This output combination 59, 61 is connected to an input combination 63, 65 of the data shift circuit 15 and to an input combination 67, 69 of a pulse suppression circuit 71, a memory clock signal input 73 of which is connected to the output 53 of the memory clock signal generator 55 and an output 75 is connected to a write clock signal input 77 of the memory 21.

In the phase detection circuit 33, the data clock signal input 31 is connected to the D-input of a D-flipflop 79 whose clock signal input C receives an inverted memory clock signal from the memory clock signal input 51. The Q-output of the D-flipflop 79 is connected to the output 59 and the $\overline{Q}$-output is connected to the output 61 of the phase detection circuit 33. Since the D-flipflop 79 stores the value of the data clock signal S1 at its D-input on the positive edges of its clock signal and hence on the negative edges of the memory clock signal S2, the waveform S3 is produced which is low when S1 is low and which is high when S1 is high when the negative edges of S2 occur. Consequently, the waveform S3 has a sudden transient whenever the negative edge of S2 passes an edge of S1 at the instant when the negative edge of S2 occurs. After the passage of a negative edge of S1, it has a positive sudden transient, and after the passage of a positive edge of S1, it has a negative sudden transient.

In the pulse suppression circuit 71, the input 67 is connected to an inverting input of a NAND-gate 81, a further input of which is connected to the $\overline{Q}$-output of a D-flip-flop 83 whose D-input is connected to the input 69 and the clock signal input C is invertingly connected to the memory clock signal input 73 of the phase detection circuit 71. The output of the NAND-gate 81 is connected to an input of an AND-gate 85, a further input of which is connected to the memory clock signal input 73 and the output is connected to the output 75 of the pulse suppression circuit 71.

The $\overline{Q}$-output of the D-flip-flop 83 supplies an inverted input signal which is delayed over one memory clock signal period and which is shown with a waveform S5 in FIG. 2. As a result a signal is produced at the output of the NAND-gate 81 which signal is shown by the waveform S6 in FIG. 2, and which occurs each time during a memory clock signal period after a negative S2 edge has passed a positive S1 edge. The AND-gate 85 then suppresses a memory clock signal pulse, which is shown in the waveform S7 in FIG. 2. In this period no write clock signal pulse is therefore applied to the write clock signal input 77 of the memory 21.

The data shift circuit 15 has a D-flip-flop 87 whose clock signal input C receives an inverted data clock signal from the input 29 and whose D-input is connected to the data signal input 13 of the data shift circuit 15 which is also connected to an input of an AND-gate 89. The Q-output of the D-flip-flop 87 is connected to an input of an AND-gate 91. Further inputs of the AND-gates 89 and 91 are connected to the inputs 63 and 65, respectively, of the data shift circuit 15. The outputs of the AND-gates 89 and 91 are each connected to an input of an OR-gate 93 whose output is connected to the output 17 of the data shift circuit 15.

In the periods between, each time, two positive edges of the data clock signal, the data signal occurs at the input 13 of the data shift circuit 15. These periods are denoted by D1, D2, ... D7 at D in FIG. 2. In the periods between, each time, two negative edges of the data clock signal, a data signal delayed over half of a data clock signal period occurs at the Q-output of the D-flipflop. These periods are denoted by D1, D2, ..., D7 at Dd in FIG. 2.

During the time when S4 is high, the delayed data signal Dd appears at the output 17 of the data shift circuit 15 and during the time when S3 is high the undelayed data signal D appears. This prevents the positive edges of the write clock signal S7 from coming too close to the ends of a data signal period, or it prevents two of these edges from falling within one and the same data signal period. In FIG. 2, arrows denote at D and Dd which data signal periods the relevant positive edges of the write clock signal S7 correspond to.

With the aid of the circuit described, it is achieved that each subsequent active write clock signal pulse edge corresponds to only one active data signal interval, and conversely.

A circuit, for example, according to FIG. 3 may be used if, due to very high clock signal and data signal frequencies, the rise times of the signals become so large that there is a risk of the correspondence between memory write instants and data to be written into being lost.

In FIGS. 3 and 4 the same reference numerals have been used for corresponding components and wave forms as in FIGS. 1 and 2. The components which need not be different from those of FIG. 1 have been omitted for the sake of clarity.

The data clock signal originating from the output 25 of the data clock signal generator 27 is applied via an inverter 95 to an input 97 of a change-over switch 99 comprising a two-to-one divider 101 and two AND-gates 103 and 105, an input of each of which is connected to the input 97. The other inputs of the AND-gates 103, 105 are connected to respective outputs of the two-to-one divider 101 so that every second data clock signal pulse appears at the output of the AND-gate 103 which is connected to an output 107 of the change-over switch 99. This is shown by way of the waveform S8 in FIG. 4, while the waveform S9 of this FIG. 4 represents the output signal of the AND-gate 105 at which the interlocated data clock signal pulses occur which are applied to an output 109 of the change-over switch 99.

The outputs 107 and 109 of the change-over switch 99 are connected to inputs 111 and 113, respectively, of the phase detection circuit 33 and to inputs 115 and 117, respectively, of the data shift circuit 15. The inputs 111 and 113 are connected to a clock signal input C of D-flip-flops 119 and 121, respectively, the D-inputs of which are connected to a high potential so that the Q-output of the D-flip-flops 119 and 121 become high when a leading edge of the signal occurs at the inputs 111 and 113, respectively. The wave forms at the Q-outputs of the D-flip-flops 119 and 121 are denoted by S10 and S12, respectively, in FIG. 4.

The Q-outputs of the D-flip-flops 119 and 121 are connected to the D-inputs of D-flip-flops 123 and 125, respectively, whose clock signal inputs C receive the inverted memory clock signal S2 from the memory clock signal input 31 of the phase detection circuit 33. As a result, the Q-outputs of the D-flip-flops 123 and 125 become high on the first negative edge S2 which succeeds the positive edge of S8 and S9, respectively, by which the Q-outputs of the D-flip-flops 119 and 121, respectively, become high.

The Q-outputs of the D-flip-flops 123 and 125 are connected to inputs of AND-gates 127 and 129, respectively, the other inputs of which are connected to the memory clock signal input 31 of the phase detection circuit 33. The Q-outputs of the D-flip-flops 123 and 125 also apply signals to outputs 131 and 133, respectively, of the phase detection circuit 33, which are illustrated by the wave forms S11 and S13, respectively, in FIG. 4.

The outputs of the AND-gates 127 and 129 connected to the clock signal inputs C of D-flip-flops 135 and 137, respectively, become high upon the occurrence of the first positive edge of S2 subsequent to the negative edge of S2, by which the Q-outputs of the D-flipflops 123 and 125, respectively, become high, so that the $\bar{Q}$-outputs of the D-flip-flops 135 and 137, respectively, become low. The $\bar{Q}$-outputs of the D-flip-flops 135 and 137 are connected via inverters to the reset inputs R of the D-flip-flops 119 and 121, respectively, which are then reset so that their Q-outputs, which are connected via inverters to the reset inputs R of the D-flip-flops 135 and 137, become low and reset the D-flip-flops 135 and 137, respectively. Together with the D-flip-flops 135 and 137, and AND-gates 127 and 129 constitute reset circuits. The AND-gates 127 and 129 ensure that the D-flip-flops 119 and 121 cannot be reset until after half a memory clock signal period after the occurrence of a negative memory clock signal edge so that the D-flip-flops 123 and 125 acquire sufficient time to write the signal value at their D-inputs. Due to the presence of the D-flip-flops 135 and 137, the reset signals for the D-flip-flops 119 and 121, respectively, only remain present until the reset actions are terminated so that fast readiness for a subsequent write action is obtained.

The Q-outputs of the D-flip-flops 123 and 125 become low, and thus have the waveform S11 and S13, respectively, on the then following second negative edge of S2 after a positive edge of S8 and S9, respectively. If, due to an edge passage, the third negative edge of S2 after the occurrence of a positive edge of S8 and S9 so that the D-flip-flops 119 and 121 were set falls before the occurrence of the next positive edge of S8 and S9, then S11 and S12, respectively, remain low until the fourth negative edge of S2 occurs, which will then fall after the next positive edge of S8. When no edge passage has taken place, S11 and S12 become high again at this third negative edge since meanwhile the D-flip-flops 119 and 121 have been set again by the subsequent positive edge of S8 and S9, respectively.

The outputs 131 and 133 of the phase detection circuit 33 are connected to inputs 139, 141, respectively, of the data shift circuit 15 and to inputs 143 and 145, respectively, of the pulse suppression circuit 71.

The inputs 115 and 117 of the data shift circuit 15 are connected to the clock signal inputs C of D-flip-flops 147 and 149 respectively, the D-input of each of which is connected to the data signal input 13 of the data shift circuit 15. Consequently, delayed data signals whose periods are denoted by D1, 3, 5, ... and D2, 4, 6, ... in FIG. 4, occur at the Q-outputs of the D-flip-flops 147 and 149, respectively, each time after the occurrence of a positive edge of S8 and S9 during two periods of the data clock signal whose periods are denoted by D1, 2, 3, ... in FIG. 4.

The Q-outputs of the D-flip-flops 147 and 149 are connected to inputs of AND-gates 151 and 153, respectively, the other inputs of which are connected to inputs 139 and 141, respectively, of the data shift circuit 15, the output of each of which is connected to an input of an OR-gate 155, the output of which is connected to the output 17 of the data shift circuit 15. A data signal then occurs at the output 17 each time during an entire period of the memory clock signal S2 succeeding a negative edge thereof. When the signals S11 and S13 are both zero, no signal is supplied from this output 17. A memory clock signal pulse is then suppressed in the pulse suppression circuit 71.

The pulse suppression circuit 71 has an OR-gate 157 whose inputs are connected to the inputs 143 and 145 of the pulse suppression circuit 71 and whose output is connected to an input of an AND-gate 159, the other input of which is connected to the input 73 and the output is connected to the output 75 of the pulse suppression circuit 71. The output signal of the OR-gate 157 is illustrated by the waveform S14 in FIG. 4 from which it is evident that during the periods of the memory clock signal S2 when both the signal S11 at the input 143 and the signal S13 at the input 145 of the pulse suppression circuit 71 are low, S14 also becomes low and the AND gate 159 cannot pass a clock signal pulse to the output 75 of the pulse suppression circuit 71 at which the write clock signal occurs during the remaining periods.

The memory 21 may be a random access memory (RAM) with an interleaved reading and writing, or it may be a serially operating circuit. A series-parallel conversion may take place, if desired, in the memory.

What was referred to as the data signal in the foregoing may be a signal occurring bit by bit in which a number of bits are associated with a signal sample, or it may be a signal with a number of bits per sample to be processed parallel. In the case of a parallel processing operation, a data shift circuit must be used per bit.

Other data shift circuits, and phase detection circuits fulfilling similar functions as those described hereinbefore may of course be used.

What is claimed is;

1. A television signal memory write circuit including a memory clock signal generator which is coupled to a write clock signal input of a memory for writing into the memory, samples of a television signal which are applied to a data signal input of said memory, said samples being obtained in response to a data clock signal generated by a data clock signal generator, said data clock signal having a frequency which is coupled by a control loop to the line frequency of the television signal, characterized in that the memory clock signal generator is free running at a frequency which is higher than the highest data clock signal frequency, while a data shift circuit is coupled to the data signal input of said memory and a pulse suppression circuit is coupled to the write clock signal input of said memory, said data shift circuit and said pulse suppression circuit being coupled to an output combination of a phase detection circuit coupled to the data clock signal generator and the memory clock signal generator for shifting the data signal and suppressing a memory clock signal pulse, respectively, when a given phase relation between the data clock signal and the memory clock signal is exceeded.

2. A television signal memory write circuit including a memory clock signal generator which is coupled to a write clock signal input of a memory for writing into the memory, samples of a television signal which are applied to a data signal input of said memory, said samples being obtained in response to a data clock signal generated by a data clock signal generator, said data clock signal having a frequency which is coupled by a control loop to the line frequency of the television signal, characterized in that the memory clock signal generator is free running at a frequency which is higher than the highest data clock signal frequency, while a data shift circuit is coupled to the data signal input and a pulse suppression circuit is coupled to the write clock signal input, said data shift circuit and said pulse suppression circuit being coupled to an output combination of a phase detection circuit coupled to the data clock signal generator and the memory clock signal generator for shifting the data signal and suppressing a memory clock signal pulse, respectively, when a given phase relation between the data clock signal and the memory clock signal is exceeded, and further characterized in that the phase detection circuit is controlled by the data clock signal and the memory clock signal, said phase detection circuit, after a first edge coincidence of these clock signals bringing about a change of its output signal value and after a subsequent edge coincidence, bringing about a return to the output signal value existing before the first edge coincidence, and the data shift circuit comprising a change-over switch with which a data signal is selected which is undelayed or which is delayed more than half a data clock signal period, and the pulse suppression circuit being a circuit only reacting to one of the two edge passages.

3. A television signal memory write circuit including a memory clock signal generator which is coupled to a write clock signal input of a memory for writing into the memory, samples of a television signal which are applied to a data signal input of said memory, said samples being obtained in response to a data clock signal generated by a data clock signal generator, said data clock signal having a frequency which is coupled by a control loop to the line frequency of the television signal, characterized in that the memory clock signal generator is free running at a frequency which is higher than the highest data clock signal frequency, while a data shift circuit is coupled to the data signal input and a pulse suppression circuit is coupled to the write clock signal input, said data shift circuit and said pulse suppression circuit being coupled to an output combination of a phase detection circuit coupled to the data clock signal generator and the memory clock signal generator for shifting the data signal and suppressing a memory clock signal pulse, respectively, when a given phase relation between the data clock signal and the memory clock signal is exceeded, and further characterized in that the data shift circuit comprises two memory elements which are alternately written into by successive data clock signal pulses and alternately read by output signals of the phase detection circuit, while the phase detection circuit comprises two flip-flops which are alternately set by successive data clock signal pulses, while an output signal of each flip-flop is written, by the memory clock signal, into a corresponding memory element and each flip-flop is reset via a reset circuit in response to an output signal of said flip-flop, an output signal of the corresponding memory element and the memory clock signal, and the corresponding memory elements supply the output signal combination of the phase detection circuit.

* * * * *